UNITED STATES PATENT OFFICE.

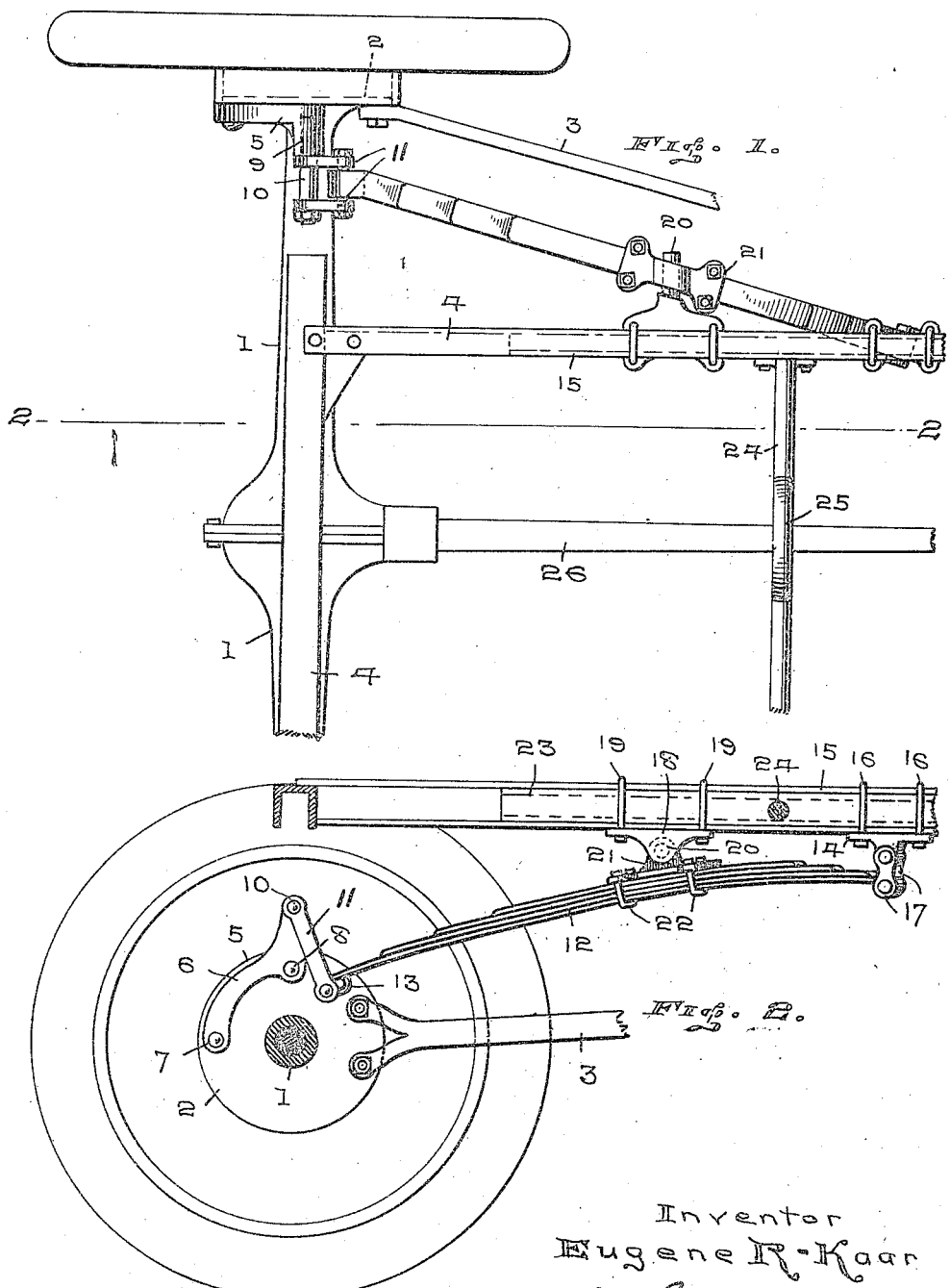

EUGENE R. KAAR, OF GALVA, ILLINOIS.

CANTALIVER-SPRING FOR AUTOMOBILES.

1,296,294.  Specification of Letters Patent.  Patented Mar. 4, 1919.

Application filed December 12, 1917. Serial No. 206,771.

*To all whom it may concern:*

Be it known that I, EUGENE R. KAAR, a citizen of the United States, residing at Galva, in the county of Henry and State of Illinois, have invented certain new and useful Improvements in Cantaliver-Springs for Automobiles; and I do hereby declare the following to be a full, clear, and exact description of the invention, such as will enable others skilled in the art to which it appertains to make and use the same.

This invention relates to new and useful improvements in automobiles, and particularly to Ford automobiles.

The principal object of the present invention is to dispense with the usual hard riding rear cross spring and substitute in lieu thereof cantaliver springs which are arranged diagonally between the frame and the ends of the rear axle housing, said springs by virtue of their relative position serving to prevent the lateral swaying movement of the vehicle body with respect to the wheels.

A further object of the invention is to pivotally support each spring at a point adjacent its forward end on each side of the frame whereby the springs will function to produce easier riding qualities.

A further object of the invention is to reinforce and brace the frame at the points of connection of the springs therewith.

With these and other objects in view as will appear as the description proceeds, the invention comprises the various novel features of construction, combination and arrangement of parts as will be fully described hereinafter and afterward specifically claimed.

Referring to the drawings:

Figure 1 represents a plan view of one side of the rear end of a Ford chassis, showing one of the cantaliver springs arranged in operative position, and Fig. 2 represents a sectional view taken on a plane indicated by the line 2—2 on Fig. 1.

Similar characters of reference are used to denote corresponding parts throughout the accompanying drawings and following description.

The present invention is designed for use in connection with Ford cars wherein the chassis or body frame is much narrower than any other car of standard make, and by virtue thereof I am enabled to position cantaliver springs diagonally between the sides of the frame and the ends of the rear axle housing to produce increased riding qualities in the vehicle.

In order that the construction and operation of the invention may be readily comprehended by those skilled in the art to which the invention relates, I have illustrated an approved embodiment thereof in the accompanying drawings and will now proceed to fully describe the same, in connection with said drawings, in which 1 indicates the rear axle housing having a flange 2 at each end, to which are connected the radius rods 3. 4 indicates the frame, and like the above mentioned parts is of the usual standard Ford construction.

For the sake of convenience and brevity I will describe the construction of the cantaliver spring at one side of the chassis, but it is to be of course understood that the opposite side is provided with an identical spring construction. The invention consists of a spring perch bracket 5 which embodies an arcuately curved arm 6 that is rigidly connected to the end flange 2 by the usual brake shoe support bolt 7 and spring perch bolt 8. The upper end of the bracket is formed with a laterally extending boss 9 into which is threaded a stud bolt 10. A pair of links 11 have their upper ends pivotally mounted on this stud bolt and their ends pivotally connected to the rear end of a cantaliver spring 12 by a bolt 13.

A spring hanger bracket 14 is securely attached to the side rail 15 of the frame by a suitable clip 16, and pivotally supports a pair of links 17 to which the forward end of the spring 12 is pivotally connected.

18 indicates a fulcrum bracket rigidly attached to the side bar 15 by clips 19 and carries a laterally extending stud 20 to which is pivotally connected a spring fulcrum bracket 21 rigidly attached to the spring 12 by clips 22 and at a point forward of the intermediate portion of the spring.

A spring of this construction and suspension will possess greatly increased riding qualities over that of the usual and well-known standard cross spring used at the rear of all Ford cars. Not only will this particular construction of spring increase the riding qualities of the vehicle, but it will also prevent lateral swinging movement of the frame or vehicle body with respect to the wheels and thereby eliminate the usual danger of the machine turning over in rounding a curve, as well as eliminate side skidding of the vehicle.

In order to reinforce the side bars of the frame, I employ reinforcing bars 23, preferably made of channel iron which are positioned within the side bars at the points of connection of the springs therewith and are rigidly held in place by the clips 16 and 19. 24 indicates a brace rod which is positioned transversely between the side bars of the frame and rigidly connected at opposite ends to the reinforcing bars 23. This brace rod is provided centrally with an arched or U-shaped portion 25 to permit of a free up and down movement of the drive shaft housing 26.

Having fully described my invention, what I claim as new, is:

In an automobile, the combination with the frame and rear axle assembly, of a spring perch bracket supported by one end of the axle housing, and having a lateral boss from which a stud bolt extends substantially parallel with and above the longitudinal axis of the axle, a spring hanger supported by one side of the frame, a diagonally arranged cantaliver spring having one end pivotally suspended from said stud to permit it under load to swing over the longitudinal center of said axle, means pivotally connecting the other end of the spring to said hanger, and means for pivotally supporting said spring intermediate its ends.

In testimony whereof I have signed my name to this specification in the presence of two subscribing witnesses.

EUGENE R. KAAR.

Witnesses:
C. D. SMITH,
DOLE U. WEST.